Patented Aug. 31, 1926.

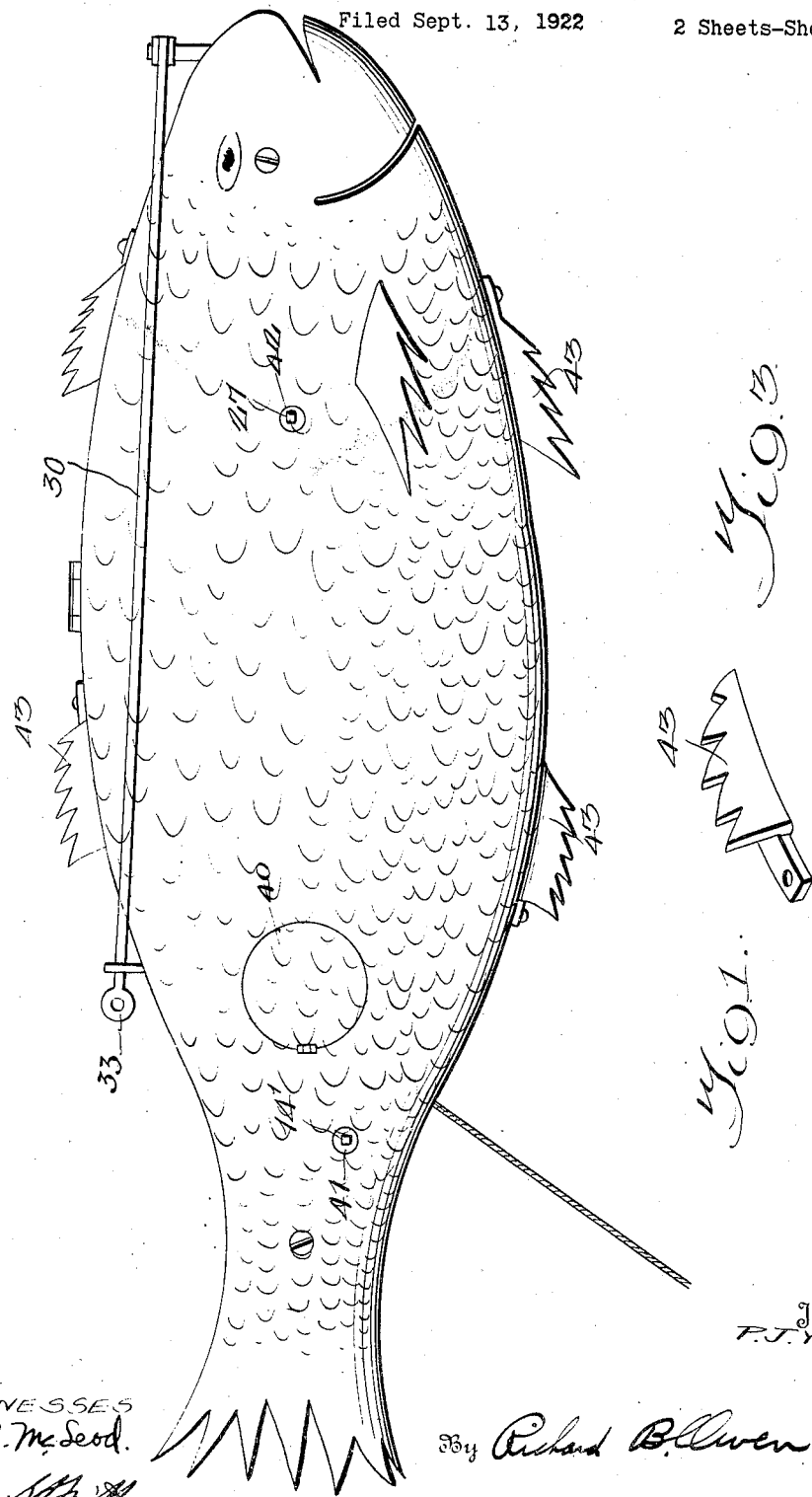

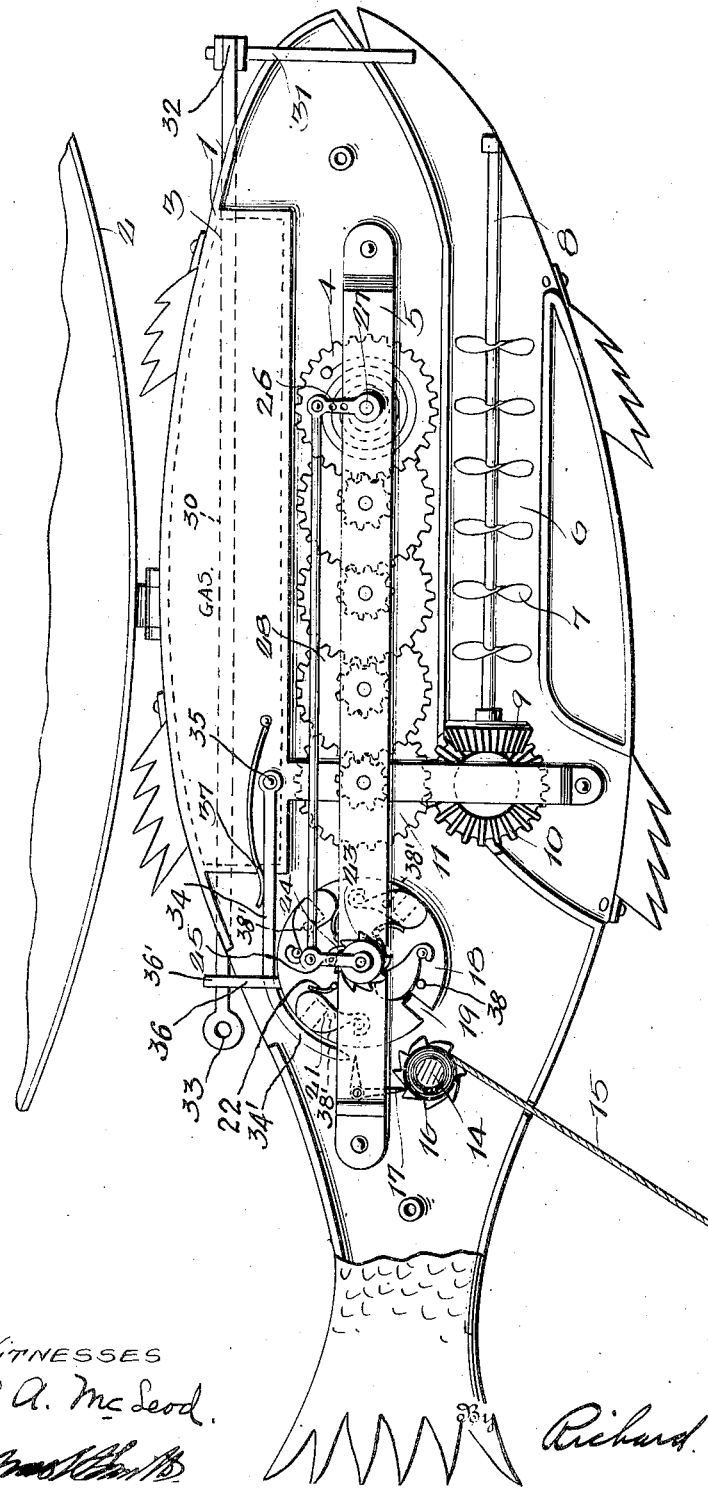

1,597,703

UNITED STATES PATENT OFFICE.

PORUS J. YOUNG, OF CLENDENIN, WEST VIRGINIA.

FISHING DECOY.

Application filed September 13, 1922. Serial No. 588,091.

The present invention relates to a fishing decoy and has for its principal object to provide means whereby the decoy may be used for trolling purposes. As is readily understood in trolling the fisherman slowly moves his boat around with the bait in the water. The main object of the present invention is to allow a fisherman to troll from the shore by providing means for moving the decoy a certain distance the same being connected to a line and reel in his possession.

Another important object of the invention is to provide a device of this nature which will be simple and efficient in construction, reliable in operation, comparatively inexpensive to manufacture, durable, and well adapted to the purpose for which it is designed.

With the above and numerous other objects in view as will appear as the description progresses, the invention resides in certain novel features of construction, and the combination and arrangement of parts as will be hereinafter more fully described and claimed.

In the drawing:—

Figure 1 is an elevation of the decoy embodying my invention,

Figure 2 is a view showing the casing of the decoy opened, and

Figure 3 is a perspective of one of the fins used in conjunction with the decoy.

Referring to the drawing in detail it will be seen that the casing of the decoy consists of two sections hinged together, section 1 as a body and section 2 acting as a lid. In section 1 there is mounted suitable buoyancy means 3 which may be in the form of a gas tank or a bag of any suitable construction so as to impart the proper or necessary buoyancy to the decoy. In the present modification of the decoy I have shown a spring motor 4 of conventional construction having its shaft journalled in the body 1 at one end and in the supporting beam 5 at the other end. A channel 6 is provided in the casing leading from the forward end thereof and terminating intermediate the ends thereof at the bottom of the casing. In the major portion of this channel 6 suitable propelling means 7 is provided on a shaft 8 which has mounted thereon at its rear end a beveled gear 9 meshing with a beveled gear 10 which is rotated by the series of gears 11 actuated by the spring motor 4.

A reel 14 is mounted in the rear portion of the casing having a bait line 15 wound thereabout. A toothed wheel 16 is mounted on this reel and is normally prevented from rotating by a dog 17 so that the length of the bait line 15 may be regulated as desired. A disk 18 is rotatably mounted between the body section 1 and the supporting beam 5 adjacent the rear end of the casing and is provided with a plurality of radially extending notches 19 at its periphery which are adapted to be closed by pivoted plates 21 which are held in a closed position by springs 22 or in any other suitable manner. This disk 18 is provided with a ratchet wheel 23 which is engageable by a dog 24 carried by the rod 25. A crank 26 is carried by the shaft 27 of the motor 4 so as to be turned thereby so as to reciprocate the connecting rod 28 which is attached to the rod 25 so that as the rod moves forwardly the dog 24 will engage the ratchet and partially rotate the disk 18.

Pivotally mounted in the casing and vertically movable therein is a lever 34 provided on its free end with an arcuate extension 34' and having its opposite end pivoted to the casing as at 35. Formed on the intermediate portion of the lever 34 is a transversely extending bar 36 provided at its lower end with a comparatively short extension and at its upper end with a somewhat longer bifurcated extension 36'. The lower extension of the lever rests upon the periphery of the disk 18 while the bifurcated extension 36' engages the rear end of the guide bar 30. As can be readily seen from Figure 2 of the drawings, the lower extension of the bar 36 is engageable with the notches 19 formed at the periphery of the disk 18, that is, when the pivoted plates are swung inwardly so as to uncover the notches. In order that the lever 34 may be normally urged into engagement with the disk 18 and the notches formed therein, a spring 37 is secured to the casing, this spring being arranged so that the forward end is in contact with and normally forces the lever 34 downward, thus tending to insert the extension formed on the bar 36 into the notches 19.

In order that the decoy motor may be automatically regulated it is essential that one of the pivoted plates 21 be set at an inner position, that is, adjacent the center of the disk so that the corresponding groove 19 will be uncovered. This may be accomplished by forming a plurality of openings in the disk 18 suitable for engagement with a pin 38. This pin is preferably provided with a tapered end adapted to engage the openings 38' formed adjacent the notches formed in the disk and arranged to hold the pivot plates 21 in an inwardly extended position so as to uncover the notch corresponding to the particular plate, as shown to advantage in Figure 2 of the drawing. As can be readily noted from the drawings, the disk will be provided with four such openings arranged adjacent the notches so that when the pin 38 is inserted in one of the openings the corresponding plate will be securely held in an inwardly projected position so as to uncover that particular notch.

Referring particularly to Figure 1 it will be seen that a door 40 is provided on the lid section so that access may be had to the distance regulating disk 18 so that it may be adjusted when the decoy is about to be released. A suitable key may be inserted through the apertures 41 and 42 so that the shafts 14' of the reel 14 and 27 of the motor 4 may be regulated and wound. A plurality of fin members 43 are mounted on the casing by screws or in any other suitable manner. Of course the casing of the decoy may be designed to resemble any fish desired without departing from the mechanical principle of construction heretofore illustrated.

In operation, the trolling line, which is preferably mounted on the common type of fishing reel, is secured to the eye formed one one end of the guide bar. The device is set to travel a predetermined distance and the forward end of the connecting rod 28 secured in proper position on the forward crank 26. This adjustment will regulate the reciprocating movement of the rear crank 25 so as to govern the rotation of the disk 18. The next operation consists of moving one of the pivoted plates 21 inwardly toward the center of the disk and locking same in this position by inserting the pin 38 in the opening formed in the disk so as to retain this particular plate out of engagement with the corresponding notch. The spring motor and bait line reel are then wound and the reel held in position by proper fitting of the dog 17. The decoy is then placed in the water and directed in its proper position and the motor released.

It is obvious, from the foregoing, that the decoy will be propelled at a suitable speed away from the fisherman who retains control of the action of the decoy through the medium of the trolling line. After the decoy has traveled the predetermined distance, the motor will be automatically stopped and the fish turned about and drawn back to the fisherman. This is accomplished by movement of the disk 18 which will be readily rotated through the medium of the cranks 25 and 26 and connecting rod 28 until the notch 19 left uncovered rotates to a position opposite the transverse bar 36. At this point, the lower extension of the transverse bar will be forced downwardly into the notch and the upper extremity 36' of the bar will release the guide bar 30 so that this member may be swung around, or rather the fish turned about in the water so that the guide bar will assume a forwardly extended position so that the operator may readily draw the decoy to the shore head foremost. Simultaneously with this action, the downward movement of the lever 34 will operate the dog 17 so that this member will disengage the toothed wheel 16 and cause the reel 14 to be quickly rotated by action of the spring. This will cause the bait line 15 to be wound upon this reel and enable the bait to be carried back in an elevated position and thus prevent tangling of the line.

It is thought that the construction and operation of the decoy will be readily understood without a more detailed description thereof, but it is desired to point out that numerous changes in the details of construction and in the combination and arrangement of parts may be resorted to without departing from the spirit of the invention as hereinafter claimed.

Having thus described my invention what I claim as new is:

1. A decoy of the class described including a casing, a propeller mechanism in the casing, a motor for the actuation of said propeller mechanism and a distance controlled device associated with the motor for stopping the same after the decoy has traveled a desired distance in the manner and for the purpose specified.

2. A decoy of the class described including a propeller mechanism, a motor for actuation of the propeller mechanism, a distance regulating device associated with the motor for stopping the same when the decoy has traveled a desired distance, a reel in the casing, and means associated with the reel for releasing the same and controlled by the distance regulating device.

3. A decoy of the class described including a casing, a propeller mechanism mounted in the casing, a motor associated with said propeller mechanism, a distance regulating device for stopping the motor after the decoy has traveled a desired distance, a reel for a bait line mounted in the casing, a ratchet on said reel, a dog controlling said ratchet for preventing operation of the reel, a lever normally held out of engagement with said dog by the distance controlling device and adapted to be released when the motor is stopped and means for the actuation of the lever when released.

4. In combination, a motor, a reciprocating rod operated by said motor, a dog operated by said reciprocating rod, a disk, a ratchet on the disk engageable with said dog for imparting an intermittent rotary motion to the disk, said disk provided with a plurality of peripheral notches, a lever, an extension on said lever, adapted to engage the periphery of the disk so that when it engages one of the notches it will stop said motor in the manner and for the purpose specified.

5. In combination, a motor, a reciprocating rod operated by said motor, a dog operated by said reciprocating rod, a disk, a ratchet on the disk engageable with said dog for imparting an intermittent rotary motion to the disk, said disk provided with a plurality of peripheral notches, a lever, an extension on said lever adapted to engage the periphery of the disk so that when it engages one of the notches it will stop said motor, and means on the disk for closing the notches in the manner and for the purpose specified.

6. In combination, a motor, a reciprocating rod operated by said motor, a dog operated by said reciprocating rod, a disk, a ratchet on the disk engageable with said dog for imparting an intermittent rotary motion to the disk, said disk provided with a plurality of peripheral notches, a lever, an extension on said lever adapted to engage the periphery of the disk so that when it engages one of the notches it will stop said motor, a reel, a ratchet on the reel, a dog associated with the ratchet, a lever adapted to engage the dog, a spring for actuating the lever, said lever being normally held out of engagement with said dog by the extension.

7. A decoy of the class described including a casing, a propelling mechanism mounted in the casing, means for automatically controlling the distance traversed by the decoy, and means for turning the decoy controlled by the operator for the return movement thereof.

In testimony whereof I affix my signature.

PORUS J. YOUNG.